United States Patent
Cousins (10) Patent No.: US 11,763,021 B2
(45) Date of Patent: Sep. 19, 2023

(54) EFFICIENT SECURE STRING SEARCH USING HOMOMORPHIC ENCRYPTION

(71) Applicant: Duality Technologies, Inc., Maplewood, NJ (US)

(72) Inventor: David Bruce Cousins, Swansea, MA (US)

(73) Assignee: Duality Technologies, Inc., Maplewood, NJ (US)

( * ) Notice: Subject to any disclaimer, the term of this patent is extended or adjusted under 35 U.S.C. 154(b) by 221 days.

(21) Appl. No.: 17/504,877

(22) Filed: Oct. 19, 2021

(65) Prior Publication Data
US 2022/0121770 A1  Apr. 21, 2022

Related U.S. Application Data

(60) Provisional application No. 63/093,547, filed on Oct. 19, 2020.

(51) Int. Cl.
| | | |
|---|---|---|
| *G06F 21/62* | (2013.01) | |
| *H04L 9/00* | (2022.01) | |
| *H04L 9/06* | (2006.01) | |
| *G06F 21/60* | (2013.01) | |

(52) U.S. Cl.
CPC .......... *G06F 21/6227* (2013.01); *H04L 9/008* (2013.01); *H04L 9/0643* (2013.01)

(58) Field of Classification Search
CPC ... G06F 21/6227; G06F 21/602; H04L 9/008; H04L 9/0643
See application file for complete search history.

(56) References Cited

U.S. PATENT DOCUMENTS

| | | | |
|---|---|---|---|
| 7,957,525 B2* | 6/2011 | Gentry | H04L 9/3247 713/180 |
| 8,566,317 B1* | 10/2013 | Ren | G06F 16/355 707/738 |
| 2013/0275696 A1* | 10/2013 | Hayasaka | G06F 3/0671 711/E12.103 |
| 2014/0233727 A1 | 8/2014 | Rohloff et al. | |
| 2015/0019499 A1* | 1/2015 | Aronovich | G06F 16/137 707/692 |

* cited by examiner

*Primary Examiner* — Darren B Schwartz
(74) *Attorney, Agent, or Firm* — PEARL COHEN ZEDEK LATZER BARATZ LLP (57) ABSTRACT

An efficient search of a target string by a query string in homomorphically encrypted space. The target string may be encoded by reordering its characters into a plurality of target substrings, each encoding non-sequential characters of the target string separated by a periodic stride K and different target substrings having stride sequences offset relative to each other. The query string may be encoded into a plurality of query substrings, each defining a repeating sequence of a different respective character value in the query string. Each of the substrings may be homomorphically encrypted and hashed. The plurality of hashed encrypted target substrings and plurality of hashed encrypted query substrings may be compared to determine if there is a search result match. A rolling hash may iteratively update the plurality of hashed encrypted target substrings by one target string slot and the comparison may be repeated for each iterative update.

20 Claims, 6 Drawing Sheets

EFFICIENT SECURE STRING SEARCH USING HOMOMORPHIC ENCRYPTION

CROSS-REFERENCE TO RELATED APPLICATIONS

This application claims the benefit of U.S. Provisional Application Ser. No. 63/093,547, filed Oct. 19, 2020, which is hereby incorporated by reference in its entirety.

FIELD OF THE INVENTION

Embodiments of the invention are directed to searching large encrypted texts composed of arbitrary character sets without exposing the underlying unencrypted data.

BACKGROUND OF THE INVENTION

Embodiments of the invention provide a technique to search for an encrypted query term in an encrypted target string, where the length of the encrypted target string N is significantly larger than the length of the encrypted query term M (e.g., by several orders of magnitude).

A homomorphic encryption (HE) scheme has a ringsize R, such that HE computations, such as search comparisons, can only be performed deterministically on a string with a maximum length of R. When the encrypted target string exceeds that threshold length N≥R the encrypted target string may be divided into segments. To search the target string, the query term is compared to each segment of the target string of the query term length M. This is done by incrementally sliding a search window defining a rolling segment of the target string, starting at the first target string segment of length M and incrementing the window by one character of the target string at a time, until all M-length segments of the target string have been compared to the query term, to detect when the query and target strings match.

Searching for a M-length query term in a target string of N characters requires N−M+1 rolling segment comparisons, which is typically a large number (e.g., hundreds, thousands, or more) as N is significantly larger than M. In addition, because the query term and the target string are homomorphically encrypted, the comparison is performed in homomorphic encryption (HE) space, which adds significant complexity to the comparison computations, typically adding at least an order of magnitude (sometimes more depending on the configuration) more computations than those performed in unencrypted space. The result of these numerous and complex computations is a very slow search procedure.

Accordingly, there is a need in the art to improve the efficiency and speed of searching a large target string of characters in homomorphically encrypted space.

SUMMARY OF THE INVENTION

Figure 1:
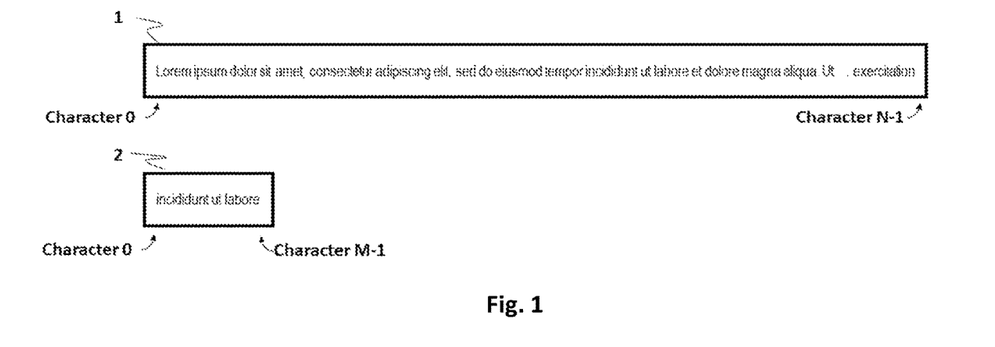
FIG. 1 is a schematic illustration of data structures for searching a large target string of characters for a query string in homomorphic encryption (HE) space, according to some embodiments of the invention.

Embodiments of the invention solve the aforementioned problem in the art by providing an efficient technique to search an encrypted target string of characters for an encrypted query string in homomorphic encryption (HE) space (see e.g., FIG. 1). Embodiments of the invention provide a new encoding to permute a large target string into a plurality of divided target substrings with reordered character sequences, such that, the query string may be simultaneously compared to a plurality of segments in the target string (see e.g., FIG. 2). This is achieved by multiplexing the characters of the target string into the plurality of target substrings by reordering the characters with a stride K, e.g., from non-consecutive spacing of K slots in the original target string to consecutive slots in the target substring. For example, the first target substring is populated by characters of target string index 0, K, 2K, . . . , the second substring is populated by characters of target string index 1, K+1, 2K+1, . . . , and the ith substring is populated by characters of target string index i, K+i, 2K+i. Each single ith index across all target substrings (a vertical column of the stacked target substrings in FIG. 2) defines a K-length rolling search window of consecutive indices beginning at index iK and ending at iK+K−1. Each substring may have a length less than or equal to (but not greater than) the ring size R used in the homomorphic encryption (HE) scheme, which is the maximum length that can be deterministically operated on at once under the HE scheme. Because the plurality of target substrings have length R, they simultaneously define R rolling search windows (R vertical columns). Similarly, the query string may also be permuted into a plurality of M query substrings of the same length (less than or equal to (but not greater than) the ring size R) (see e.g., FIG. 3). Each query substring may encode a repeating sequence of a different single character value in the query string. All target and query substrings may be encrypted and hashed. All query substrings are compared to all target substrings, e.g., based on their hashes (see e.g., FIG. 4). Comparing the query substrings to each ith index (vertical column) of the target substrings is equivalent to simultaneously searching all iKth rolling window segments of the target string. Because both query and target substring have a length equal to (or less than) the ring size, all substrings may be fully and deterministically compared simultaneously rendering a comparison equivalent to comparing the query string to a plurality of R (all iKth) rolling window segments of the original target string. Comparing all query and target substrings of length R is equivalent to simultaneously searching R rolling search windows, leading to a search speed-up on the order of the ring size R. The comparison process may repeat on a rolling basis, shifting the query substrings down by one row each time, multiple (e.g., K−1 or more if M<L) additional times. Each iteration in which the query substrings are shifted down the line of stacked target substrings by one row, is equivalent to incrementing the iK rolling search windows by one character in the original target string. The process may repeat for multiple query substrings shifts (e.g., K−1 rolling shifts, or more if M<L), until all rolling search windows starting at characters indices iK+1 to (i+1) K−1 in the target string are searched on a rolling basis (see e.g., FIG. 5). Hashes of the query and target substrings are compared to determine if there is a matching search result.

In an embodiment of the invention, an efficient search is provided for a target string of characters to be searched for a query string of characters in homomorphically encrypted space. The target string may be encoded by reordering its characters into a plurality of target substrings, wherein each target substring encodes non-sequential characters of the target string separated by a periodic stride K and different target substrings have stride sequences offset in the target string relative to each other. Each of the plurality of target substrings may be encrypted by homomorphic encryption and hashed into a plurality of hashed encrypted target substrings. The query string may be encoded into a plurality of query substrings, wherein each query substring defines a repeating sequence of a different respective character value in the query string. Each of the plurality of query substrings may be encrypted by homomorphic encryption and hashed into a plurality of hashed encrypted query substrings. The plurality of hashed encrypted target substrings and plurality of hashed encrypted query substrings may be compared to determine if there is a search result match. A rolling hash may be executed to iteratively update the plurality of hashed encrypted target substrings to represent characters in the target string all incremented by one slot and the comparison may be repeated for each iterative update of the plurality of hashed encrypted target substrings until all search windows of the target string have been searched.

BRIEF DESCRIPTION OF THE FIGURES

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE INVENTION

Embodiments of the invention provide secure and rapid searching of a large encrypted target string of characters with an encrypted query string. The length N of the encrypted target string is larger than the ring size R (e.g., greater than $10^{13}$ characters, where the ring size depends on the HE scheme), the length M of the encrypted query string is significantly smaller than the ring size (e.g., less than $10^2$ characters), and the length N of the encrypted target string is significantly larger than the length M of the encrypted query string (e.g., by a difference of at least $10^{11}$ characters). Because the length N of the encrypted target string is larger than the ring size R, operations on the encrypted target string are inoperable in its entirety under the HE scheme. The encrypted target string may thus be divided into a plurality of smaller target sub-segments that are each equal to (or smaller than, but approximately equal to) the ring size R and so, are executable under the HE scheme. Encoding the encrypted target string in the plurality of target sub-segments of length R packs the data in as large a block as can be computed under the encryption scheme (size R). Each single character or entire vector comparison uses about the same computational time. Thus, conventional searches that compare each character of the query against the target string segments require on the order of N comparison computations, whereas embodiments of the invention pack the same data into the plurality of target string segments of maximal size R that reduces the number of comparisons to be on the order of N/R. Instead of comparing one character at a time, embodiments of the invention compare R characters at a time. The speed-up according to embodiments of the invention is thus on the order of the ring size R of the encryption scheme (e.g., $10^{13}$). In the example discussed below, to search for "Anna" in the book Anna Karenina, embodiments of the invention encoded the book in under 30 vectors of ring size length 65,536, instead of thousands of rolling M-length vectors required for conventional use, and executed the search about 52,088 times faster according to embodiments of the invention than by conventional character-by-character comparison methods.

Figure 2:
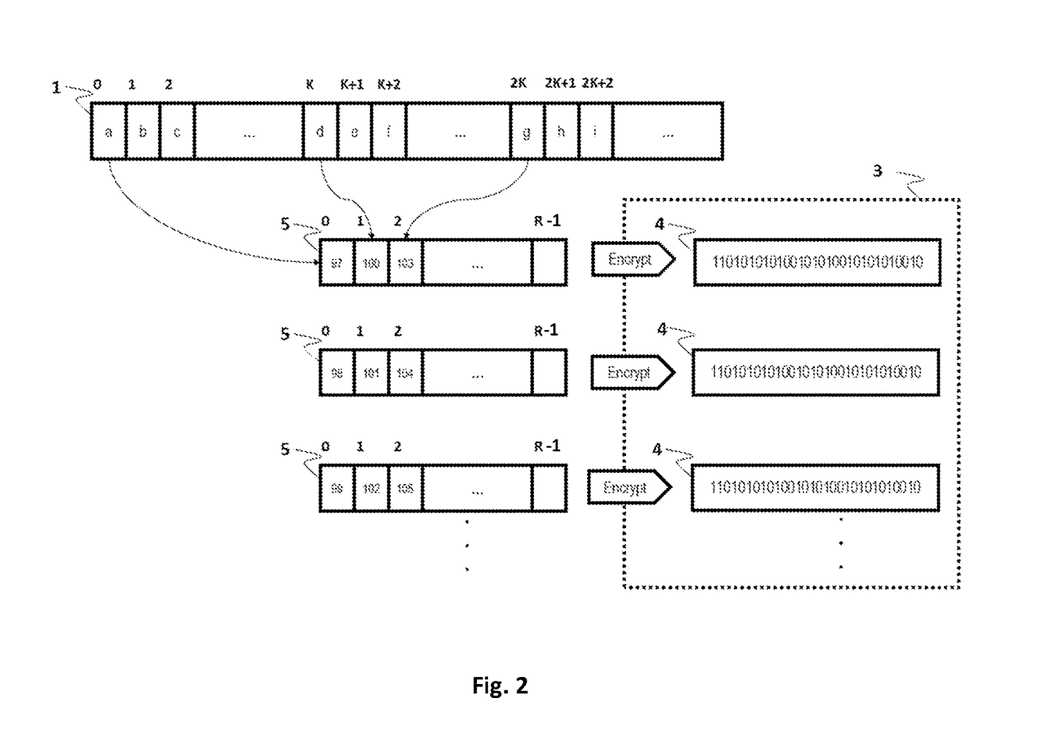
FIG. 2 is a schematic illustration of data structures for encoding and encrypting the target string of FIG. 1, according to some embodiments of the invention.

The encrypted target string is encoded into a plurality of subdivided target segments or substrings where the character sequences are reordered, such that, each target segment encodes non-sequential characters of encrypted target string with a stride equal to K (separated by K-sized index jumps) and different target segments have strides sequences incremented relative to each other. For example, the first target substring encodes character in the original target string at indices 0, K, 2 k . . . , the second target substring encodes character in the original target string at indices incremented by one relative to the first target substring 1, K+1, 2K+1, . . . and so on. Each character value may be translated to an integer (e.g., "a" assigned ascii value=97, "b" assigned ascii value=98, etc.). Encoding target segment with stride K means a rolling search window starting at index iK of the original target string is simultaneously defined by a single ith index across all target segments (e.g., a vertical column when target segments are stacked as shown in FIG. 2). The entire length of all target segments (R vertical columns when target segments are stacked) simultaneously defines R rolling search windows of the original target string.

Figure 3:
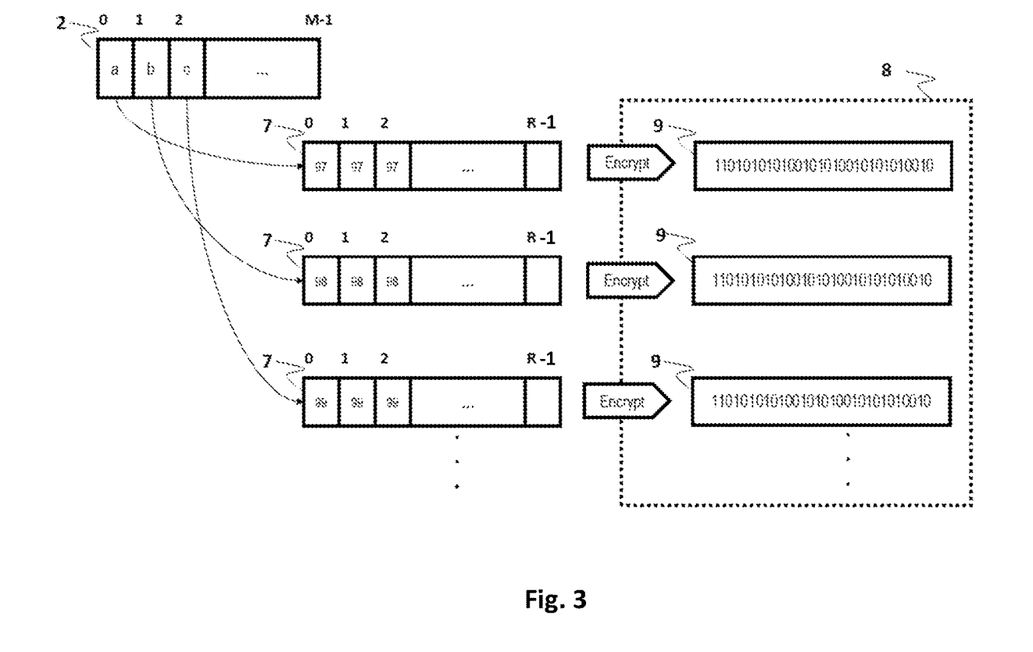
FIG. 3 is a schematic illustration of data structures for encoding and encrypting the query string of FIG. 1, according to some embodiments of the invention.

The query string of length M is also encoded as a plurality of query substrings of length R. Each ith query substring may define a repeating sequence of the ith character value as an integer R times (e.g., "a" assigned ascii value=97, "b" assigned ascii value=98, etc.) (as shown in FIG. 3). For example, to search for "ANNA," the first query substring may represent a string of A's repeated R times, the second query substring will represent a string of N's repeated R times, and so on.

Figure 4:
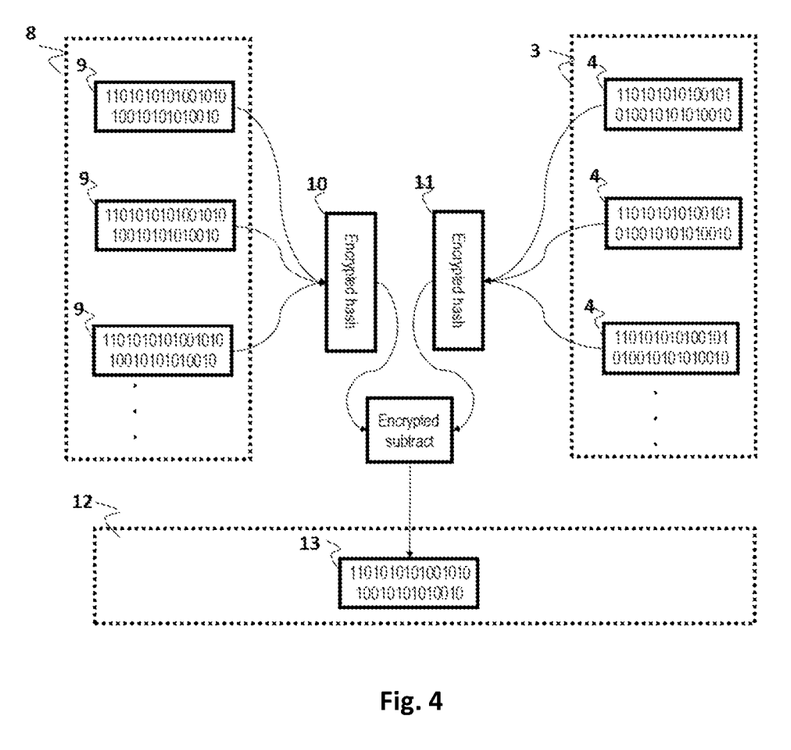
FIG. 4 is a schematic illustration of data structures for a hash search of the target string encoded in FIG. 2 for the query string encoded in FIG. 3, according to some embodiments of the invention.

All query and target substrings may be encrypted and hashed. The plurality of hashed encrypted query substrings may then be respectively compared to the plurality of hashed encrypted target substrings to determine if there is a match (search result) or not (no search result) (as shown in FIG. 4). Comparing each ith column of the stacked hashed encrypted query substrings with the ith column of the stacked hashed encrypted target substrings is equivalent to searching the iKth rolling search window of the original target string for the query string. Because the R-length plurality of hashed encrypted target substrings define R stacked columns, comparing all query and target substrings simultaneously searches for the query in a plurality of R rolling search windows. For example, searching for "ANNA," the A in the first query substring index will be compared to all iKth indices (first target substring indices), the N in the second query substring index will be compared to all iK+1th indices (second target substring indices), and so on, so that ANNA is simultaneously compared to every search window starting at all periodic indices iK.

Figure 5:
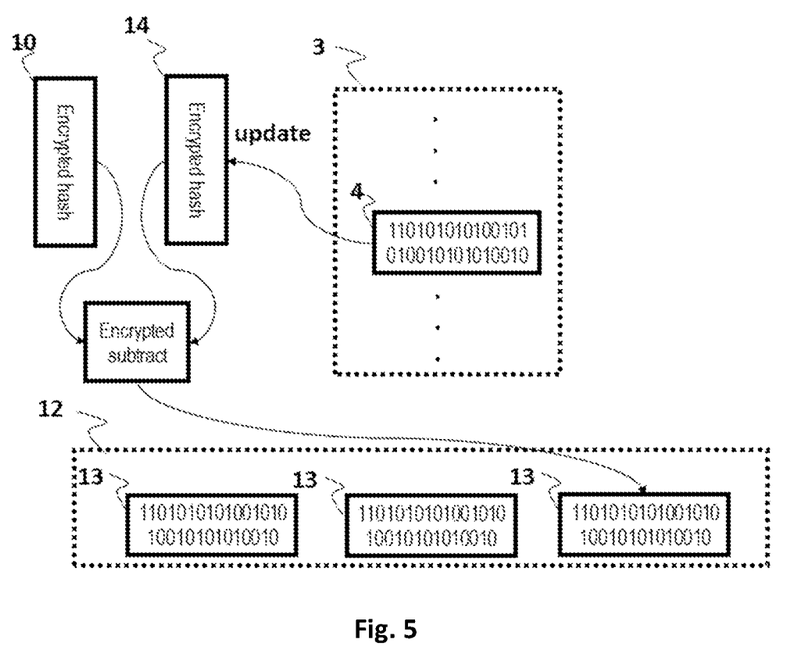
FIG. 5 is a schematic illustration of data structures for executing a rolling hash of the search of FIG. 4, according to some embodiments of the invention.

Each such comparison of all iKth windows skips the K−1 rolling windows between the K-length strides. To fill in this gap, the plurality of hashed encrypted target substrings is updated multiple (e.g., K−1 times), on a rolling basis, each time shifting the set of query strings one row down the set of target strings, equivalent to incrementing the original target string characters in the search window by one index, and the computations are repeated (as shown in FIG. 5). The multiple (e.g., K−1) rolling computations may thus search windows iK+1, iK+2, . . . iK+K−1.

To increase efficiency, the rolling hash of each rolling window may be computed in each incrementing iteration such that a new hash value of each target substring is calculated by updating the hash value of the prior incremented substring by removing the hash contribution of the tail portion of the substring removed from the prior iteration's search window and adding the hash contribution of the head portion of the substring appended in the current iteration's search window. The new hash value is thus computed based only on the difference between the new and prior substrings, and not the overlapping common segments of the substrings, which are reused from the prior substring's hashing, thereby significantly reducing the hashing computations and increasing search speed.

Reference is made to FIG. 1, which schematically illustrates data structures for searching a large target string of characters 1 for a query string 2 in homomorphic encryption (HE) space, according to some embodiments of the invention. The example large target string 1 has integer length N characters and the query string 2 has integer length M characters. Embodiments of the invention provide a rapid string search of large target string 1 composed of arbitrary character sets. Embodiments of the invention may implement a modified Rabin-Karp algorithm, modified for the intrinsic plaintext modulo arithmetic present in RLWE based Homomorphic Encryption Schemes. Embodiments of the invention may also utilize a Single Instruction, Multiple Data (SIMD) feature of vector encoding supported in this scheme. Although target and query strings 1 and 2 are described as character strings, any data (e.g., numbers, patterns, or any data represented by a binary or other encoding sequence) may be used. For example, target string 1 may be a database, file or any data structure.

Reference is made to FIG. 2, which schematically illustrates data structures for encoding and encrypting the target string 1 of FIG. 1, according to some embodiments of the invention. Target string 1 may be encoded into a set of target substrings 5. Target substrings 5 may in turn be encrypted to generate a set 3 of encrypted target substrings 4 each of which may also be referred to as a ciphertext or "batch". The number of encrypted target substrings 4 in the set 3 may be denoted by integer L. The encryption settings selected encrypts a set of integers as a vector in a single ciphertext. The length of each vector R is equal to the ring size of the ciphertext.

Each character of target string 1 may be converted to a signed integer. This can be done e.g., by using the ASCII value of the character and converting that value to a signed integer. Integers may be grouped into target substrings 5 represented by vectors with a stride through the target string 1 equal to K. Stride K may be computed from the query string length M and the target string length N.

Target substrings 5 may be encrypted directly into encrypted target substrings 4 using a packed vector encoding, in which the ciphertext contains a full vector of up to R elements). Note the original target string 1 may be zero padded out to fill all the available elements of the encrypted target substrings 4. The length of the set 3 of encrypted target substrings 4 is larger than the length of the query string 2, and may be limited by the number of homomorphic multiplies (e.g., depth) that the encryption scheme is set to support.

Given a vector encoded ciphertext with a ring size R (determined from the cryptographic system used), a long text of length N, and the substring to search for of length M. Generally N is very much larger than M, M is very much smaller than R, and N is very much larger than N. Accordingly, the large text N may be split into components that can be operated on in parallel by the SIMD capability of most modern HE schemes. Computing the stride K through the target string 1 may be performed, e.g., as follows, although other algorithms may be used.

Algorithm for computing stride K:
Given:
  a vector encoded ciphertext ring size R
  a text length N
  a substring length M
  1→estimate $L_{est}$=int(ceil((float(N)/float(R))))
  2→adjust $L_{est}$ as follows:
  while (not done){
  // Compute a vector of offsets[ ]:
  For I=0; i<RI i++:
    offset[i]H*($L_{est}$−M+1)
  // Compute the largest index possible
  // with these parameters
  $I_{largest}$=offset[offset.size( )−1]+($L_{est}$−1)
  if $I_{largest}$>=N
    L=$L_{est}$
    done=true; //EXIT LOOP
  else
    Lest++//increment estimate of L
  Set stride K==L In this algorithm, an estimate, $L_{est}$, may first be determined of the number L of ciphertexts in the set 3 of encrypted target substrings 4. This may be performed by taking the floating-point ratio of N and R, taking its ceiling function (e.g., rounding it up to the nearest integer but keeping it floating point representation) and then converting that to an integer.

Next, $L_{est}$, may be adjusted e.g., by conducting the following steps in a loop, repeating the loop until an exit condition described below is met.

First loop step: compute a vector of length R representing R character offsets into the target string 1. Each ith offset (e.g., starting count at zero as is customary in computer science and languages such as C and C++) is computed as the offset i times the value determined by the combination of $L_{est}$ minus M plus one.

Second loop step: compute, $I_{largest}$, the largest possible index into target string 1 that is achieved when using the highest value offset as the starting point and adding a value equal to the current $L_{est}$ minus one. If $I_{largest}$ is greater or equal to the length of the text in target string 1, then stop the loop and set the final value of L to be equal to $L_{est}$;

otherwise, increase the value of $L_{est}$ by one and return to the first loop step above and continue in a similar manner, until the value of $L_{est}$ generates a value of $I_{largest}$ that is greater or equal to the length N of target string 1.

Because each single index i (or vertical column when stacked as shown in FIG. 2) of the plurality of target substrings defines a K-length search window (e.g., search string indices iK, . . . , (i+1)K−1), and there are L such indices i (or L-length vertical columns), the stride K may be equivalent and set to the number L of the plurality of target substrings.

Reference is made to FIG. 3, which schematically illustrates data structures for encoding and encrypting the query string 2 of FIG. 1, according to some embodiments of the invention. Characters from query string 2 are converted to signed integers and encoded into a plurality of query substrings 7 containing R repeated copies of that integer. The plurality of query substrings 7 are then encrypted in the same manner as the target substrings 4 in FIG. 2. The resulting encrypted query substrings 9 are grouped into a set 8.

Reference is made to FIG. 4, which schematically illustrates data structures for searching the target substrings 4 encoded in FIG. 2 for the query substrings 9 encoded in FIG. 3, according to some embodiments of the invention. An encrypted query hash 10 (e.g., a Rabin-Karp rolling hash) is generated from all M encrypted query substrings 9 in query set 8. Starting with the first encrypted target substring 4 in the target set 3, an encrypted target hash 11 is generated from the first M encrypted target substrings 4 using the same (e.g., a Rabin-Karp rolling hash) method. Each computation using M encrypted query substrings 9 simultaneously searches M rows of target substrings 4, which is equivalent to the first M characters of each of the R search windows, starting at iK and ending at iK+M−1. If the number L of target substrings 4 (e.g., also equal to stride K) is equal to M, a single computation may search all of the entire K-length search windows. If however, the number L of target substrings 4 is greater than M, the remaining L-M rows or length of the search windows may be searched by rolling through those additional rows or indices. The encrypted target hash 11 is subtracted from the encrypted query hash 10 and the result is stored as a first entry in a set 12 of search result ciphertexts 13. Using a rolling hash may increase the efficiency of computing encrypted target and query hashes 10 and 11. Because of the SIMD nature of the operation, encrypted subtraction may be executed simultaneously over the entire ring size vector of all encrypted target and query hashes 10 and 11, which leads to further efficient operation.

The initial encrypted rolling hash may be generated as shown, e.g., in the following example algorithm, although other rolling hash algorithms may be used.

Algorithm for initializing an encrypted rolling hash
Given
  A set (vector) of encoded ciphertext pat[ ] of length M
  A constant D that is the size of the alphabet (e.g., 256) and an encrypted version $D_{enc}$
  The plaintext modulus of the encryption scheme P
  1→Zeros=vector of zeros of length ringsize
  2→Initialize $p_{hash}$=encrypted (e.g., zeros)
  compute encrypted $p_{hash}$
  For i=0; i<M; i++:
    $p_{hash}$=*$D_{enc}$
    //where *= is done encrypted
  3→compute encrypted $h_{enc}$
  h=1:
  For i=0; i<M−1; i++:
    h=*D
  $h_{enc}$=encrypted(h)
  4→compute encrypted rolling hash $p_{hash}$
  For i=0; i<M; i++:
    $p_{hash}$=($p_{hash}$*$D_{enc}$+pat[i])
    //where * and + is done encrypted modulo P.

For the above algorithm, a set of encoded ciphertexts of length M, a constant D that is the size of the alphabet (e.g., 256), an encrypted version $D_{enc}$, and a plaintext modulus of the encryption scheme P, are given. Initially, a vector may be generated of integer zeros of length R (the ring size). Next, $p_{hash}$ may be initialized which is the encrypted vector of zeros above. The initial value of encrypted $p_{hash}$ may then be computed e.g. as follows. A new value of $p_{hash}$ may be generated that is set to the old value of $p_{hash}$ times $D_{enc}$ where the multiplication operation is e.g., a Hadamard multiplication performed in encrypted form using the homomorphic encryption EvalMult operation modulo P. This may be repeated M times.

Next, the encrypted hash $h_{enc}$ may be computed, e.g., as follows: First an unencrypted value h may be initialized, e.g., to be equal to 1. A new value of h may then be generated which is set to the old value of h times D. This may be repeated M times as well. Then, $h_{enc}$ may be generated by encrypting h. Next, the initial encrypted rolling hash $p_{hash}$ may be computed e.g., as follows: generate a new value of $p_{hash}$ which is set to the old value of $p_{hash}$ times $D_{enc}$ plus the encrypted version of the first character in the M-length search substring pattern where the multiplication operation is e.g. a Hadamard multiplication and the addition operation is e.g. a vector encryption executed in encrypted form using the homomorphic encryption EvalMult and EvalAdd operations modulo P. This may be repeated M times to incorporate the first M characters of the pattern. This process may be executed once to generate the encrypted query hash 10. The process may be repeated for the first M characters of the encrypted target hash 11 that is based on the text of target string 1.

After initializing the encrypted target hash 11, the encrypted target hash of the text of target string 1 may be updated on a rolling basis for every other character in the set 3 of encrypted target substring 4, e.g., using the algorithm as follows, although other algorithms may be used:

Algorithm for updating encrypted rolling target hash:
Given:
  A set (vector) of encoded ciphertext txt[ ] of length N
  A substring of length M
  An encrypted rolling hash $p_{hash}$
  An encrypted $h_{enc}$
  An encrypted constant $D_{enc}$
  The plaintext modulus of the encryption scheme P
  1→update the encrypted rolling hash with the ith ciphertext txt[i]
  $p_{hash}$=($D_{enc}$*($p_{hash}$−txt[i]*$h_{enc}$)+txt[i+M])
  where all addition, multiplication and subtraction is done modulo the plaintext modulus P.

Note the modulo arithmetic used by the Rabin-Karp rolling hash may be automatically applied by the plaintext modulus arithmetic provided by the lattice encryption.

For each new character in the set 3 (vector) of encoded target ciphertext txt[ ] of length N, the encrypted rolling hash may be updated with the ith ciphertext txt[i] using this procedure.

In this algorithm, the new value of $p_{hash}$ in a current iteration may generated by taking the old value of $p_{hash}$ in a prior iteration and subtracting the encrypted product of the encrypted text corresponding to the oldest (e.g., first appearing in the text string) character and $h_{enc}$, then multiplying that result by $D_{enc}$. Then, the encrypted value of the newest character in the text may be added to be compared. Again here all addition, multiplication and subtraction is executed e.g., modulo the plaintext modulus P.

Note that while the operation is described to be incremented by "one character," embodiments of the invention operate over ciphertexts containing a ringsize R length vector of characters. Thus, the rolling operations are executed in parallel over all ringsize R characters in the ciphertext. This makes embodiments of the invention more efficient than a single character encrypted ciphertext version.

Reference is made to FIG. 5, which schematically illustrates data structures for executing a rolling hash of the search of FIG. 4 defining a rolling window along the target string, according to some embodiments of the invention. An updated rolling encrypted target hash 14 may be generated and subtracted from the encrypted query hash 10 and the result is stored as the next entry in the set 12 of search result ciphertexts 13. This process may be repeated K−1 times, generating a set of a total of K search result ciphertexts 13 in the output set 12. Each time the process is repeated, the prior iteration's encrypted target hash 11 is updated by incrementing the text of target string 1 by one character (e.g., roll through all other ciphertexts in the set 3). The updated rolling encrypted target hash 14 (e.g., associated with current or new iKth search windows) may be generated by modifying a prior iteration's target hash 11 (e.g., associated with a prior iterations iK−1th search windows) by removing a hash contribution associated with the characters removed by rolling the search windows (e.g., incremented one slot) and adding a hash contribution associated with characters added by rolling the search windows (e.g., incremented one slot). The updated rolling encrypted target hash 14 may be generated using the above algorithm for updating encrypted rolling hash.

The set 12 of search result ciphertexts 13 are then decrypted, creating N vectors of length ring size R. Every zero entry in the search result ciphertexts 13 may correspond to a match of query string 2 in the original target string 1. The table of offsets used to map the results into the indices of target string 1 are already computed by the above algorithm for computing stride K. Thus, every zero entry generated in the set 12 of search result ciphertexts 13 is mapped to a unique index in the original target string 1. A zero entry at an index indicates that the substring is present starting at that index.

In some embodiments, the match information derived from the subtraction of the two hashes may be obscured by multiplying each of the search result ciphertexts 13 by an encrypted vector of random numbers before being sent for decryption. The zero entries will remain zero, and the nonzero entries may be totally randomized.

Software implementation and measured performance results: The above algorithm has been implemented in software that contains the code for a single integer being encrypted in a ciphertext. This is a NON SIMD implementation encrypting one character per ciphertext. It shows one search through the largest text that can be implemented efficiently with a somewhat homomorphic encrypted text without the SIMD approach described in this invention. The resulting text is only 32 characters long. Software code has been written to implement an embodiments of the invention using SIMD to enable searching a much larger text using the technique described above. The summary of the performance is shown in the following table. The code was run on a 16 core Dell® XPS laptop. The first version searched for the word "Anna" in the first 32 characters of the book "Anna Karenina". The second version searched for the same word in the entire book in the same amount of time. Embodiments of the invention were shown to be approximately 52,088 times more efficient than the naïve encrypted implementation. Note that if it were not for overlaps in the text (e.g., the last M−1 characters in a target search window are too few to be compared to the M query substrings so they are carried over to the next target search window to be searched), embodiments of the inventive would be R=ring size=65536 times more efficient at searching than the naïve approach.

| Version | Search String (M = 4) | N Text size | Execution time |
|---|---|---|---|
| Strsearch_enc_1 | Anna | 32 characters | 16.131 sec |
| Strsearch_enc_2 | Anna | 1,666,846 characters | 15.186 sec |

Note that the algorithm for computing stride K was used with a ring size of 65,536. The initial $L_{est}$ was 26 and was adjusted to 29 by the algorithm to account for the overlap to scan the complete text.

Figure 6:
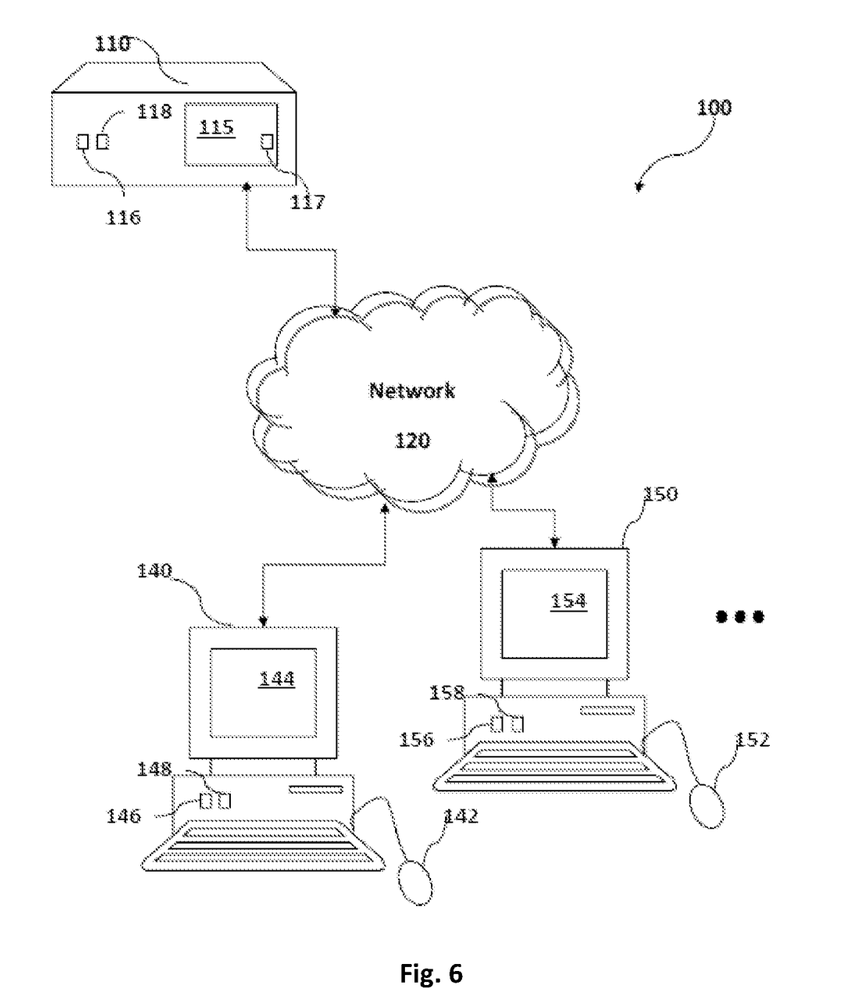
FIG. 6 is a schematic illustration of a system for efficiently searching a target string of characters for a query string in HE space, according to some embodiments of the invention.

Reference is made to FIG. 6, which schematically illustrates a system 100 for executing a secure string search using homomorphic encryption, according to some 'embodiments of the invention. The above described embodiments may be executed using any single or combination of devices and/or components of system 100 of FIG. 6. The devices of system 100 may be operated by one or more parties including secure and insecure parties. Secure parties may operate on unencrypted data (e.g., homomorphically encrypting the data), while insecure parties typically operate on the homomorphically encrypted (but not unencrypted) data using the secure string search algorithm.

System 100 may include one or more server(s) 110, database(s) 115, and/or computer(s) 140, 150, . . . , any of which may operate as a secure or insecure party. Any or all of system 100 devices may be connected via one or more network(s) 120. Secure parties may each securely store unencrypted (or encrypted) data and private keys associated with each dataset, party, etc. Insecure parties may not access the unencrypted data or private keys.

Database 115 may include software processes or applications for storing and retrieving data 117 such as data structures (1)-(14) of FIGS. 1-5, computations, and/or encryption and/or decryption keys. Data 117 may also include code (e.g., software code) or logic, e.g., to enable the application of the secure string search algorithm according to embodiments of the invention. Database 115 may be internal or external to one or more of server(s) 110 and/or computer(s) 140 and/or 150 (not shown) and may be connected thereto by a local or remote and a wired or wireless connection. In alternate embodiments, data 117 may be stored in an alternate location separate from database 115, e.g., memory unit(s) 118, 148, and/or 158.

Computers 140 and 150 may be servers, personal computers, desktop computers, mobile computers, laptop computers, and notebook computers or any other suitable device such as a cellular telephone, personal digital assistant (PDA), video game console, etc., and may include wired or wireless connections or modems. Computers 140 and 150 may include one or more input devices 142 and 152, respectively, for receiving input from a user (e.g., via a pointing device, click-wheel or mouse, keys, touch screen, recorder/microphone, other input components). Computers 140 and 150 may include one or more output devices 144 and 154 (e.g., a monitor or screen) for displaying data to a user provided by or for server(s) 110.

Network 120, which connects server(s) 110 and computers 140 and 150, may be any public or private network such as the Internet. Access to network 120 may be through wire line, terrestrial wireless, satellite or other systems well known in the art.

Server(s) 110 and computers 140 and 150, may include one or more controller(s) or processor(s) 116, 146, and 156, respectively, for executing operations according to embodiments of the invention and one or more memory unit(s) 118, 148, and 158, respectively, for storing data (e.g., encryption and/or decryption keys, and encrypted and/or decrypted data) and/or instructions (e.g., software for applying computations or calculations, keys to encrypt or decrypt data according to embodiments of the invention) executable by the processor(s). Processor(s) 116, 146, and/or 156 may include, for example, a central processing unit (CPU), a digital signal processor (DSP), a microprocessor, a controller, a chip, a microchip, an integrated circuit (IC), or any other suitable multi-purpose or specific processor or controller. Memory unit(s) 118, 148, and/or 158 may include, for example, a random access memory (RAM), a dynamic RAM (DRAM), a flash memory, a volatile memory, a non-volatile memory, a cache memory, a buffer, a short term memory unit, a long term memory unit, or other suitable memory units or storage units.

Figure 7:
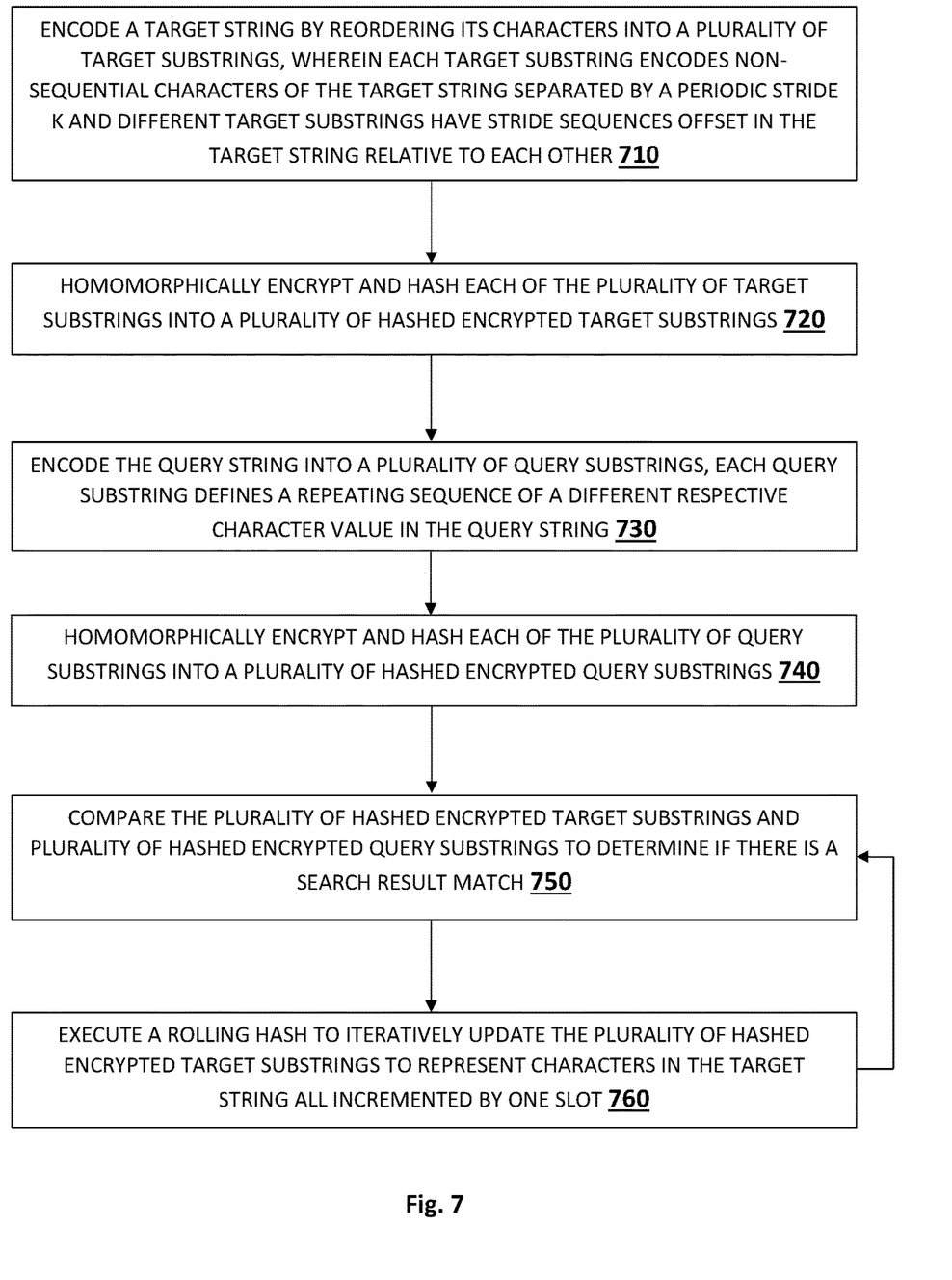
FIG. 7 is a flowchart of a method for efficiently searching a target string of characters for a query string in HE space, according to some embodiments of the invention.

Reference is made to FIG. 7, which is a flowchart of a method for efficiently searching a target string of characters for a query string of characters in HE space, according to some embodiments of the invention. Operations of FIG. 7 may generate or use the data structures disclosed in reference to FIG. 6 and may be executed by processor(s) and/or stored in memory devices e.g., depicted in FIG. 3 (e.g., one or more processors 116 and/or one or more memory unit(s) 118 or database(s) 115, respectively). Other devices or systems may also be used.

In operation 710, a processor may encode the target string by reordering its characters into a plurality of target substrings. Each target substring may encode non-sequential characters of the target string separated by a periodic stride K and different target substrings have stride sequences offset in the target string relative to each other.

In operation 720, a processor may homomorphically encrypt and hash each of the plurality of target substrings into a plurality of hashed encrypted target substrings.

In operation 730, a processor may encode the query string into a plurality of query substrings, wherein each query substring defines a repeating sequence of a different respective character value in the query string.

In operation 740, a processor may homomorphically encrypt and hash each of the plurality of query substrings into a plurality of hashed encrypted query substrings.

The plurality of target substrings and the plurality of query substrings both have length equal to the ring size R of the HE scheme so that it may be deterministically operated on at once in its entirety.

In operation 750, a processor may compare the plurality of hashed encrypted target substrings and plurality of hashed encrypted query substrings to determine if there is a search result match. According to the encoding in operations 710 and 730, each ith single index across all of the plurality of hashed encrypted target substrings simultaneously defines a rolling search window of consecutive indices beginning at index iK in the target string. Comparing the ith index across all of the plurality of hashed encrypted target substrings with the ith index across all of the plurality of hashed encrypted query substrings in operation 750 is thus equivalent to simultaneously searching all iKth rolling window segments of the target string.

In operation 760, a processor may execute a rolling hash to iteratively update the plurality of hashed encrypted target substrings to represent characters in the target string all incremented by one slot and repeating operation 750 to compare each iterative update of the plurality of hashed encrypted target substrings and the plurality of hashed encrypted query substrings to determine if there is a search result match in any of the updated search windows. The rolling hash may be executed in each iterative update by updating the plurality of hashed encrypted target substrings from a prior iteration by removing a hash contribution associated with the characters in the target string eliminated by incremented one slot and adding a hash contribution associated with the characters in the target string added by incremented one slot. The rolling hash may be executed K−1 times to update the plurality of hashed encrypted target substrings to represent characters in the target string incremented by moving the rolling search window starting from indexes iK to iK+K−1. If M=L, the entire iK search windows may be compared to the query in one computation. If however M<L, rolling hash updates may be used to increment the search window to scan the last L-M characters of the iK search windows of the target string (e.g., equivalent to the last L-M rows of the plurality of hashed encrypted target substrings) in one or more additional comparison computations.

Other operations, or orders of operations, may be used.

Approximately or about may refer herein to a deviation from an exact measure of any threshold less than or equal to 10% and/or one order of magnitude. Significantly may be referred herein to as greater than by 50% and/or multiple orders of magnitude.

In the foregoing description, various aspects of the present invention are described. For purposes of explanation, specific configurations and details are set forth in order to provide a thorough understanding of the present invention. However, it will also be apparent to persons of ordinary skill in the art that the present invention may be practiced without the specific details presented herein. Furthermore, well known features may be omitted or simplified in order not to obscure the present invention.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulates and/or transforms data represented as physical, such as electronic, quantities within the computing system's registers and/or memories into other data similarly represented as physical quantities within the computing system's memories, registers or other such information storage, transmission or display devices.

The aforementioned flowchart and block diagrams illustrate the architecture, functionality, and operation of possible implementations of systems and methods according to various embodiments of the present invention. In this regard, each block in the flowchart or block diagrams may represent a module, segment, or portion of code, which may comprise one or more executable instructions for implementing the specified logical function(s). In some alternative implementations, the functions noted in the block may occur out of the order noted in the figures or by different modules. Unless explicitly stated, the method embodiments described herein are not constrained to a particular order or sequence. Additionally, some of the described method embodiments or elements thereof can occur or be performed at the same point in time. Each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Embodiments of the invention may include an article such as a non-transitory computer or processor readable medium, or a computer or processor non-transitory storage medium, such as for example a memory (e.g., memory units 118, 148, and/or 158 of FIG. 6), a disk drive, or a USB flash memory, encoding, including or storing instructions, e.g., computer-executable instructions, which, when executed by a processor or controller (e.g., processor 116, 146, and/or 156 of FIG. 6), carry out methods disclosed herein.

In the above description, an embodiment is an example or implementation of the inventions. The various appearances of "one embodiment," "an embodiment" or "some embodiments" do not necessarily all refer to the same embodiments. Although various features of the invention may be described in the context of a single embodiment, the features of embodiments may also be provided separately or in any suitable combination. Conversely, although the invention may be described herein in the context of separate embodiments for clarity, the invention may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions. It will further be recognized that the aspects of the invention described hereinabove may be combined or otherwise coexist in embodiments of the invention.

The descriptions, examples, methods and materials presented in the claims and the specification are not to be construed as limiting but rather as illustrative only. While certain features of the present invention have been illustrated and described herein, many modifications, substitutions, changes, and equivalents may occur to those of ordinary skill in the art. It is, therefore, to be understood that the appended claims are intended to cover all such modifications and changes as fall with the true spirit of the invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Different embodiments are disclosed herein. Features of certain embodiments may be combined with features of other embodiments; thus certain embodiments may be combinations of features of multiple embodiments.

The invention claimed is:

1. A method for efficiently searching a target string of characters for a query string of characters in homomorphically encrypted space, the method comprising:
    encoding a data structure in one or more hardware processors representing the target string by reordering its characters into a plurality of target substrings, wherein each target substring encodes non-sequential characters of the target string separated by a periodic stride K and different target substrings have stride sequences offset in the target string relative to each other;
    encrypting by homomorphic encryption and hashing each of the plurality of target substrings into a plurality of hashed encrypted target substrings;
    encoding the query string into a plurality of query substrings, wherein each query substring defines a repeating sequence of a different respective character value in the query string;
    encrypting by homomorphic encryption and hashing each of the plurality of query substrings into a plurality of hashed encrypted query substrings;
    comparing the plurality of hashed encrypted target substrings and plurality of hashed encrypted query substrings to determine if there is a search result match; and
    executing a rolling hash by the one or more hardware processors to iteratively update the plurality of hashed encrypted target substrings to represent characters in the target string all incremented by one slot and repeating the comparing for each of the iterative updates of the plurality of hashed encrypted target substrings.

2. The method of claim 1, wherein the rolling hash is executed in each of the iterative updates by updating the plurality of hashed encrypted target substrings from a prior iteration by removing a hash contribution associated with the characters in the target string eliminated by incremented one slot and adding a different hash contribution associated with the characters in the target string added by incremented one slot.

3. The method of claim 1, wherein each 44 single index i across all of the plurality of hashed encrypted target substrings simultaneously defines a rolling search window of consecutive indices beginning at an index that is a product iK of the single index i and the periodic stride K in the target string.

4. The method of claim 1, wherein comparing an index i across all of the plurality of hashed encrypted target substrings with the index i across all of the plurality of hashed encrypted query substrings is equivalent to simultaneously searching all rolling window segments at indexes that are a product K of the index i and the periodic stride K of the target string.

5. The method of claim 1 comprising executing the rolling hash a number of times K−1 that is one less than the periodic stride to update the plurality of hashed encrypted target substrings to represent the characters in the target string incremented by moving the rolling search window starting from indexes iK that are a product of the index i and the periodic stride K to indexes iK+K−1 that are the product plus one less than the periodic stride.

6. The method of claim 1, wherein the plurality of target substrings and the plurality of query substrings have length equal to a ring size R of the homomorphically encrypted space.

7. The method of claim 1 comprising determining the stride K by:
    estimating a number L to be an estimated number $L_{est}$ by taking a ceiling of a floating-point ratio of a length N of the target string and a ring size R of the homomorphically encrypted space;
    adjusting the estimated number $L_{est}$ by:
        executing a first loop comprising computing a vector of length equal to the ring size R representing a number of character offsets equal to the ring size R into the target string, each offset of index i computed as the offset of index i times a value determined by a combination of the estimated number $L_{est}$ minus a length M of the query string minus one;

executing a second loop comprising computing a largest possible index $I_{largest}$ into the target string that is achieved when using a highest value offset as a starting point and adding a value equal to a current value of one minus the estimated number $L_{est}-1$, wherein if the largest possible index $I_{largest}$ is greater than or equal to the length N of the target string, stop the second loop and set a final value of the number L to be equal to the estimated number $L_{est}$; otherwise, increase the estimated number $L_{est}$ by one and return to the first loop and continue until the estimated number $L_{est}$ generates a value of the largest possible index $I_{largest}$ that is greater than or equal to the length N of the target string; and setting the periodic stride K equal to the final value of the number L.

8. The method of claim 2 comprising initializing the rolling hash by:

generating a vector of integer zeros of length of a ring size R of the homomorphically encrypted space;

initializing an encrypted vector comprising zeros;

computing an initial value of the encrypted vector by generating a new value of the encrypted vector set to a prior value of the encrypted vector times an encryption of a constant that is a size of an alphabet D, and repeating M times the generating the new value of the encrypted vector;

computing an encrypted hash by initializing an unencrypted value h, generating a new value of the unencrypted value h set to an old value of the unencrypted value h times the size of the alphabet D, repeating M times the generating the new value of the unencrypted value h, and generating the encrypted hash by encrypting the unencrypted value h; and computing an initial encrypted rolling hash by generating a new value of the encrypted vector which is set to an old value of the encrypted vector times the encryption of the constant that is the size of the alphabet D plus an encrypted version of a first character in a search substring pattern of a length M, and repeating generating the new value of the encrypted vector M times to incorporate the first M characters of the pattern.

9. The method of claim 8 comprising updating the rolling hash by generating a new value of the encrypted vector taking a prior iteration's value of the encrypted vector and subtracting an encrypted product of the first character in each hashed encrypted target substring and the encrypted hash to produce a result, multiplying the result by the encryption of the constant that is the size of the alphabet D and adding an encrypted value of a last character in the hashed encrypted target substring.

10. The method of claim 1 comprising comparing the plurality of hashed encrypted target substrings and the plurality of hashed encrypted query substrings using Single Instruction, Multiple Data (SIMD) computations.

11. A system for efficient searching comprising:

one or more non-transitory memories to store a target string of characters and a query string of characters in homomorphically encrypted space; and one or more processors configured to:

encode the target string by reordering its characters into a plurality of target substrings, wherein each target substring encodes non-sequential characters of the target string separated by a periodic stride K and different target substrings have stride sequences offset in the target string relative to each other, encrypt by homomorphic encryption and hashing each of the plurality of target substrings into a plurality of hashed encrypted target substrings, encode the query string into a plurality of query substrings, wherein each query substring defines a repeating sequence of a different respective character value in the query string, encrypt by homomorphic encryption and hashing each of the plurality of query substrings into a plurality of hashed encrypted query substrings, compare the plurality of hashed encrypted target substrings and plurality of hashed encrypted query substrings to determine if there is a search result match, and execute a rolling hash to iteratively update the plurality of hashed encrypted target substrings to represent characters in the target string all incremented by one slot and repeat the comparing for each of the iterative updates of the plurality of hashed encrypted target substrings.

12. The system of claim 11, wherein the one or more processors are configured to execute the rolling hash in each of the iterative updates by updating the plurality of hashed encrypted target substrings from a prior iteration by removing a hash contribution associated with the characters in the target string eliminated by incremented one slot and adding a different hash contribution associated with the characters in the target string added by incremented one slot.

13. The system of claim 11, wherein each single index i across all of the plurality of hashed encrypted target substrings simultaneously defines a rolling search window of consecutive indices beginning at an index that is a product iK of the single index i and the periodic stride K in the target string.

14. The system of claim 11, wherein comparing an index i across all of the plurality of hashed encrypted target substrings with the index i across all of the plurality of hashed encrypted query substrings is equivalent to simultaneously searching all rolling window segments at indexes that are a product K of the index i and the periodic stride K of the target string.

15. The system of claim 11, wherein the one or more processors are configured to execute the rolling hash a number of times K−1 that is one less than the periodic stride to update the plurality of hashed encrypted target substrings to represent the characters in the target string incremented by moving the rolling search window starting from indexes iK that are a product of the index i and the periodic stride K to indexes iK+K−1 that are the product plus one less than the periodic stride.

16. The system of claim 11, wherein the plurality of target substrings and the plurality of query substrings have length equal to a ring size R of the homomorphically encrypted space.

17. The system of claim 11, wherein the one or more processors are configured to determine the stride K by executing code to:

estimate a number L to be an estimated number $L_{est}$ by taking a ceiling of a floating-point ratio of a length N of the target string and a ring size R of the homomorphically encrypted space, adjust the estimated number $L_{est}$ by:

executing a first loop comprising computing a vector of length equal to the ring size R representing a number of character offsets equal to the ring size R into the target string, each offset of index i computed as the offset of index i times a value determined by a combination of the estimated number $L_{est}$ minus a length M of the query string minus one, executing a second loop comprising computing a largest possible index $I_{largest}$ into the target string that is achieved when using a highest value offset as a starting point and adding a value equal to a current value of one minus the estimated number $L_{est}-1$, wherein if the largest possible index $I_{largest}$ is greater than or equal to the length N of the target string, stop the second loop and set a final value of the number L to be equal to the estimated number $L_{est}$; otherwise, increase the estimated number $L_{est}$ by one and return to the first loop and continue until the estimated number $L_{est}$ generates a value of the largest possible index $I_{largest}$ that is greater than or equal to the length N of the target string, and set the periodic stride K equal to the final value of the number L.

18. The system of claim 12, wherein the one or more processors are configured to initialize the rolling hash by executing code to:

generate a vector of integer zeros of length of a ring size R of the homomorphically encrypted space, initialize an encrypted vector comprising zeros, compute an initial value of the encrypted vector by generating a new value of the encrypted vector set to a prior value of the encrypted vector times an encryption of a constant that is a size of an alphabet D, and repeating M times the generating the new value of the encrypted vector, compute an encrypted hash by initializing an unencrypted value h, generating a new value of the unencrypted value h set to an old value of the unencrypted value h times the size of the alphabet D, repeating M times the generating the new value of the unencrypted value h, and generating the encrypted hash by encrypting the unencrypted value h, and compute an initial encrypted rolling hash by generating a new value of the encrypted vector which is set to an old value of the encrypted vector times the encryption of the constant that is the size of the alphabet D plus an encrypted version of a first character in a search substring pattern of a length M, and repeating generating the new value of the encrypted vector M times to incorporate the first M characters of the pattern.

19. The system of claim 18, wherein the one or more processors are configured to update the rolling hash by executing code to generate a new value of the encrypted vector by taking a prior iteration's value of the encrypted vector and subtracting an encrypted product of the first character in each hashed encrypted target substring and the encrypted hash to produce a result, multiplying the result by the encryption of the constant that is the size of the alphabet D and adding an encrypted value of the last character in the hashed encrypted target substring.

20. The system of claim 11, wherein the one or more processors are configured to compare the plurality of hashed encrypted target substrings and the plurality of hashed encrypted query substrings using Single Instruction, Multiple Data (SIMD) computations.

* * * * *